United States Patent [19]
Gorman

[11] 3,899,567
[45] Aug. 12, 1975

[54] METHOD OF MANUFACTURING DYNAMIC PRESSURE SEAL

[76] Inventor: Gerald W. Gorman, Rt. 2, Box 320, Midlothian, Tex. 76065

[22] Filed: Aug. 12, 1974

[21] Appl. No.: 496,560

[52] U.S. Cl. ............... 264/318; 264/325; 264/328; 264/334
[51] Int. Cl. ............................................. B29c 7/00
[58] Field of Search ............ 264/325, 328, 318, 334

[56] References Cited
UNITED STATES PATENTS

| | | | |
|---|---|---|---|
| 2,583,441 | 1/1952 | Palmer | 264/318 X |
| 3,004,298 | 10/1961 | Haynie | 264/325 X |
| 3,077,637 | 2/1963 | Peickii | 264/318 X |
| 3,341,647 | 9/1967 | Aberle | 264/325 |
| 3,402,713 | 9/1968 | Senkowski | 264/318 |
| 3,559,249 | 2/1971 | Patton | 264/328 X |

*Primary Examiner*—Richard R. Kucia
*Attorney, Agent, or Firm*—James C. Fails

[57] ABSTRACT

A method of manufacturing an annular seal, having protruding sealing lips that must not be damaged, by a multi-step process that is characterized by features of both compression and transfer molding techniques. Specifically, the method comprises repeating cycles, each cycle including the steps of: assembling a mold having a centrally disposed stem, a concentric press ring, a concentric master ring about a portion of the press ring and the stem, and a compression ring; heating the mold; inserting a material for forming the seal and pressing the material into a seal cavity formed intermediate the stem, the master ring and the compression ring and the press ring; curing the material into the final seal at the desired vulcanizing temperature; and unloading the seal by a critical series of steps to alleviate problems with damaging the seal. The critical series of steps are disclosed specifically; as are the specific apparatus facilitating carrying out the invention.

5 Claims, 6 Drawing Figures

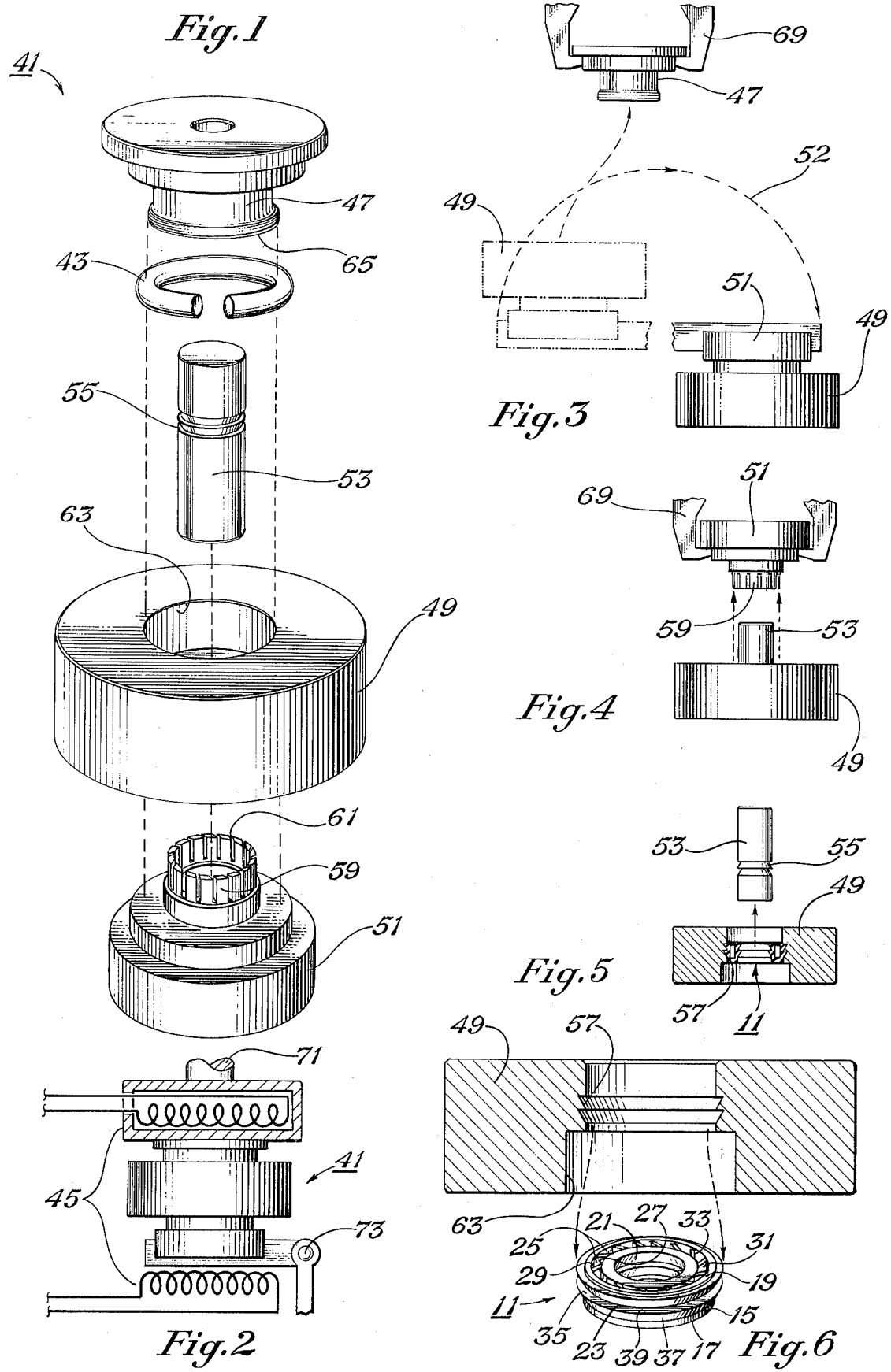

METHOD OF MANUFACTURING DYNAMIC PRESSURE SEAL

BACKGROUND OF THE INVENTION:

1. Field of the Invention

This invention relates to seal devices. More particularly, it relates to an improved method for forming seals for sealing against a differential pressure and between an internal surface of a cylinder and an outer cylindrical surface of a member disposed therewithin.

2. Description of the Prior Art

The prior art has seen the development of myriad fluid sealing devices. The seals have been employed in a wide variety of environments for a wide variety of purposes. Fluid seal devices of a type suitable for use with a rod and cylinder under pressure loading conditions have, in the past, frequently comprised a stack of seal elements, such as a conventional Vee-type packing element. Such prior art seal devices were subject to a number of disadvantages. In my U.S. Pat. No. 3,554,569, I described an improved class of seal devices referred to as dynamic pressure seal devices that obviated many of the difficulties of the prior art type seals. My improved dynamic seals have been so advantageous that they are widely sought throughout the world. They have protruding exterior lips that improve their effectiveness. In my copending application Ser. No. 409,904, filed Oct. 26, 1973 and entitled "Dynamic Pressure Seals Having Even Wear", I delineated a further improvement of these seals.

In view of the demand, it became apparent that a pseudo production line method of manufacturing them needed to be employed in the interest of efficiency. Early attempts to manufacture the seals by a conventional production line method resulted in an unacceptably high percentage of rejects because of damage to the seals.

SUMMARY OF THE INVENTION

Accordingly, it is an object of this invention to produce fluid seals of the so-called dynamic pressure type and obviate the disadvantages of the prior art.

It is a specific object of this invention to provide a method for manufacturing dynamic pressure seals that obviate the disadvantages of the prior art and alleviate problems with having an unacceptably high rate of damaged finished seals.

These and other objects will become apparent from the descriptive matter hereinafter, particularly when taken in conjunction with the appended drawings.

In accordance with this invention, seals of the so-called dynamic pressure type are manufactured by a multi-step process that combines advantageous features of both compression and transfer molding techniques. Specifically, a mold is assembled with a plurality of separable parts and heated to a first predetermined temperature. A predetermined piece of material for forming the seal is inserted into the mold. The material is then pressed into the seal cavity within the mold and heated under a pressure to a predetermined temperature for a time sufficient to produce a final seal. The final seal is then unloaded by a critical series of steps that allows the seal to accommodate local deformation without damage. The critical series of steps will be delineated hereinafter.

Preferably, the mold containing the seal is inverted to facilitate removal of the seal by the critical series of steps.

BRIEF DESCRIPTION OF THE DRAWINGS

FIG. 1 is an exploded isometric view showing the parts of the mold and the material for forming the seal.

FIG. 2 is a side elevational view of the assembled seal intermediate the heated platens for forming the seal.

FIG. 3 is a side elevational view illustrating a portion of the critical steps for removing an undamaged seal following the heating of FIG. 2.

FIG. 4 is a side elevational view illustrating a next consecutive portion of the critical series of steps following that of FIG. 3.

FIG. 5 is a side elevational view showing a next portion of the critical series of steps following FIG. 4.

FIG. 6 is a cross sectional view, partly isometric, showing the removal of the seal as the final step in the critical series of steps in a cycle and following FIG. 5.

DESCRIPTION OF PREFERRED EMBODIMENT(S)

In my U.S. Pat. No. 3,554,569, and the hereinbefore referenced application Ser. No. 409,904; the descriptive matter of both of which is incorporated herein by reference for details that are omitted herefrom; I described, respectively, an improved dynamic pressure seal device and an improvement therein that prolonged the life and usefulness of the seals. For example, in the above referenced patent, there is illustrated a seal device, or seal, 11 in a typical installation between an internal surface of a cylinder and an outer cylindrical surface of a member disposed therewithin. Specifically, the installation showed the seal 11 between a cylinder head and a jack plunger in a hydraulic elevator apparatus. In this environment, the seal device was held in place by a mechanical cap ring that was secured to the upper end of the cylinder head by conventional means. It carried a conventional wiper ring. In such an application, the annular lips about the seal in combination with the dynamic pressure feature of the seals, provided unusually effective and long lasting sealing action.

In order to understand the problems with the manufacture of the seal, it is believed helpful to consider the seal 11, per se. The seal 11, FIG. 6, is generally in the form of a ring having a body 15, a closed end face 17, an open end face 19, an inner side 21 and an outer side 23. The closed end face 17 is ordinarily of planar construction, although it may be of peaked, arcuate or other cross sectional shape. The open end face 19, as shown, is planar, lying in a plane transverse to the central longitudinal axis of the seal 11. The open end face 19 has a plurality of openings therein, each of which is the entry to a cavity 25. The cavity 25 has an inner side wall 27, an outer side wall 29 and end walls 31. The cavities 25 are symmetrically disposed within the seal body 15, so that the wall thickness between a cavity outer side wall 29 and the body outer side 23 is substantially equal to the wall thickness between a cavity inner side wall 27 and the body inner side 21. The body material between adjacent cavities forms ribs 33. Adjacent ribs 33 have substantially equal wall thickness. The cavity depths are substantially equal, with the cavity bottoms being a distance from the closed end face 17 that is approximately the same as the distance between a cavity side wall and a corresponding body side. The transverse sectional areas of the cavities 25 are substantially uniform throughout the cavity lengths. The central plane of the ribs 33 are slanted with respect to the cavity side walls 27 and 29 so that the cavity transverse sectional area shape is generally like a parallelogram. It will be appreciated that in smaller diameter seals, the sides become more arcuate and depart more from the parallelogram. The central plane of the ribs 33 are also slanted at a critical angle with respect to a radial plane passing through the center of the ribs 33. The critical angle $\alpha$ was described in detail in the above referenced Ser. No. 409,904 and that descriptive matter is incorporated herein by reference, as indicated.

Integral with the seal device body 15, disposed at uniformly spaced intervals along the inner side 21 and the outer side 23 and extending outwardly therefrom are a plurality of sealing lips 35. Each sealing lip has a side surface 37 that diverges outwardly from the body 15 in the direction away from the closed end face 17 to form an inclined surface and merges with an end surface 39 that is in a plane transverse to the body central axis.

The advantages and installation of the seal are described in the hereinbefore referenced U.S. Pat. No. 3,554,569 and application Ser. No. 409,904. In the latter application, the canting of the ribs 33 at an angle to provide even wear, or prevent the line of uneven wear, was delineated. That improved structure may be employed in this invention, also.

Referring to FIGS. 1–6, the method of making the annular seal 11 comprises a plurality of steps. The steps are first listed in an overall view of the method and described thereafter in detail. The mold 41, FIG. 1, is assembled. The assembled mold is heated to a first predetermined temperature. A predetermined piece of material 43 is inserted into a cavity within the assembled mold. The material is softened by the heat and forced into a seal cavity. The compression and transfer of seal material is effected by pressing a compression ring into conforming fit in the top of the seal cavity within the mold. Thereafter, the mold with the seal material pressed into place is heated, as by heated platens 45, FIG. 2. The temperature and pressure are those conventionally employed for the material of which the seal will be made and will be described hereinafter for a particular example.

Thereafter, the seal is unloaded by a critical series of steps as follows:

1. The compression ring 47 is pulled from a first end of the master ring 49 and from the top of the seal cavity, as illustrated in the dashed lines of FIG. 3.

2. Next, the press ring 51 is removed from the second and opposite end of the master ring 49, as illustrated in FIG. 4. To facilitate removal of the press ring, it is preferred that the remainder of the mold after the removal of the compression ring 47 be inverted, as illustrated by the transition line 52 from the ghost line figure to the solid line figure in FIG. 3.

The removal of the press ring 51 withdraws the teeth from within the cavities within the seal and allows the seal to flex and accommodate deformation that would otherwise be damaging.

3. Next, the stem 53 is moved out of the second end of the master ring 49. As illustrated in FIG. 5, the stem 53 is moved upwardly out of the finished seal 11 and the master ring 49.

4. Next, the seal 11 is moved out of the first end and enlarged aperture of the master ring 49, or downwardly as illustrated in FIG. 6.

The removal of the stem 53 out of the second end and the seal 11 out of the first end allows the respective interior and exterior sealing lips to move up an inclined surface instead of pulling against a surface that is at an angle of 90° with respect to the central longitudinal axis of the seal 11 and the stem 53. This, in combination with the removal of the teeth to allow deformation, prevents damage to the seal.

The following descriptive matter gives details of the respective steps to ensure that even the details are clear to the reader.

The mold 41 is assembled by emplacing the stem 53 annularly and conformingly within the press ring 51. As illustrated, the stem 53 comprises a cylinder with grooves 55 for forming the lips 35 on the seal 11. The base portion of the cylindrical stem 53 conformingly fits within a central cylindrical aperture in the press ring 51. The conforming fit is close enough in tolerance that the material is not extruded between the stem 53 and press ring 51 when the seal is formed by heat and pressure. The master ring 49 is then inserted over the stem 53 and the press ring 51 with the press ring 51 on the bottom. This is inverted as compared to the conventional mold placement.

The three units thus form a seal cavity. The upper portion of the seal cavity has a broad opening for easily receiving material 43 from which a seal will be prepared. The bottom portion of the seal cavity is somewhat intricate. The master ring 49 has second grooves 57, FIGS. 5 and 6, for forming the exterior lips 35 on the seal 11. The stem 53 and the master ring 49 are assembled such that the respective inner and outer sealing lips 35 are disposed at the same relative planes along the seal 11. The press ring 51 has upwardly protruding teeth 59. The teeth 59 are separated by respective slots 61 for defining the ribs 33 of the final seal 11. The slots are canted at an angle as described hereinbefore with respect to respective radials passing their midpoints such that seal material forced into the cavity will have the desired shape of the seal. Specifically, the slots are disposed at an angle such that the seal is formed with no radial along which there is solid material in the seal between its interior wall and its exterior wall.

The compression ring 47 may be emplaced with its lower portion within the top of the cavity, within the recessed aperture 63 of the master ring 49, and about the stem 53 before the mold is heated. Alternatively, the compression ring 47 may be heated independently of the remainder of the mold 41.

In any event, the mold, including the compression ring 47, is heated to a first predetermined temperature. The heating of the mold may be carried out by any suitable means; such as, infrared lamps, or other heat lamps; conduction; convection; or heated platens, such as described hereinafter with respect to FIG. 2. The first predetermined temperature is within a few degrees of the temperature for curing the material from which the seal will be made. Typically, where rubber is employed, it is near the vulcanizing temperature. For example, I have employed 325°F as the first predetermined temperature when the material 43 is rubber. Thereafter, the compression ring 47 is removed and the predetermined piece of material 43 is inserted within the top portion of the seal cavity for forming the seal.

The material from which the seal 11 will be formed, is preferably an elastomeric material, such as rubber or polymerized elastomeric composition. The rubber may be natural or synthetic. Suitable elastomeric compositions include polyester elastomers like DuPont's Hytrel and the polyurethane elastomers (either of the three commercially available types). Any of the desirable materials of construction that are employed in the seal art to resist deterioration in the presence of particular fluids for which designed, may be employed in manufacturing the improved seal of this invention. I have found it advantageous to form the seal 11 from rubber in accordance with conventional thermoforming pressures and temperatures, as described herein.

As illustrated, the piece of material 43 comprises a straight cylindrical piece of rubber that is bent to place the ends contiguous each other when inserted into the seal cavity, or the recessed aperture 63. The piece of material 43 is wrapped around the stem 53 such that it will be pushed downwardly by the bottom part, or compression member 65, of the compression ring 47. Specifically, the illustrated cylindrical piece of rubber 43 comprises an extruded piece of rubber that is cut to the desired length.

Thereafter, the compression ring 47 is pressed into conforming fit in the top of the seal cavity. This pressing forces by compression and transfer, the material 43 into and fills the seal cavity to form the seal 11. Because of the slots 61, the rubber is forced downwardly about the teeth to form ribs at an angle such that no radial of the seal has solid material intermediate the interior and exterior walls of the seal.

The heated mold and the heated, softened semimolten material 43 forced into the seal cavity to form the seal is clamped intermediate suitable means and heated. The semi-molten material 43 is forced into all of the seal cavity to form the desired seal with the ribs at the angle such that no radial has the solid material, as described hereinbefore. The heating of the mold may be carried out by any suitable means; such as, infrared lamps, or other heat lamps; conduction; convection; or heated platens, such as described hereinafter with respect to FIG. 2. Ordinarily, it is advantageous if one of the platens 45 is fixed in place and the other platen movable. For example, the top platen may be movable, as by a retraction shaft 71; while the bottom platen is fixed at a predetermined level, although it is rotatable about a shaft 73 for inverting a portion of the mold, as will be described with respect to FIG. 3 hereinafter. The retraction shaft 71 may be operable responsive to hydraulic or pneumatic cylinder for imposing the desired compression force, via compression ring 47, on the seal within the seal cavity. In any event, the material 43 is converted by pressure and heat for a desired time interval into the final seal. The length of time and the temperature at which the seal material 43 is heated to form the seal will be those conventional to the material. For example, I have employed rubber and have vulcanized the rubber at a temperature of 325°F for time intervals of from 8 to 15 minutes. I have found the optimum time interval to be about 10 minutes with the rubber.

Thereafter, the seal is unloaded by a critical series of steps. The mold and seal may be allowed to cool before unloading. On the other hand, the unloading can be effected while still hot by using suitable holding apparatus to mechanically hold the pieces. This is advantageous in that it conserves the appreciable sensible heat of the mold and speeds up the production of the seals. A little extra care is employed to prevent damage if the seals are unloaded while they are still hot.

Specifically, the compression ring 47 is pulled from the first end and top of the cavity by suitable means, such as tongs 69.

If desired, the remainder of the mold may be disassembled with a mold in position indicated by ghost lines in FIG. 3. Preferably, however, the mold is inverted, as indicated hereinbefore.

Next, the press ring 51 is pulled from the second end of the master ring 49. When inverted, the second end is the top of the master ring 49. The tongs 69 may be employed for pulling the press ring 51 from the master ring 49. Removal of the press ring 51 withdraws the teeth 49 from within their respective cavities within the seal. This allows the seal to flex and accommodate a degree of deformation that would otherwise be damaging to the seal if the deformation were made against the teeth 59 in place.

Next, the stem 53 is pulled upwardly out of the second end of the inverted master ring 49. In this way, the inclined surface of the respective grooves 55 moves upwardly along conformingly inclined surfaces of the respective lips instead of pulling against a surface at an angle of 90° to the central longitudinal axis of the stem 53. Since the teeth are out of the respective cavities, the seal can undergo adequate deformation through the gradual movement up the inclined surfaces and no damage is experienced during the removal of the stem. Removal of the stem 53 in a conventional method without inverting the mold frequently damaged the seal.

Next, the seal 11, which has been left in place in the master ring 49, is ejected downwardly out of the bottom, or out of the first end, of the master ring 49, as illustrated in FIG. 6. Again, the seal 11 is able to deform, since the teeth 59 have been removed from the respective cavities; and to accommodate the movement of the respective inclined surfaces of the lips and grooves such that no damage is suffered by the seal 11 in the ejection.

Thereafter, the mold is ready to be reassembled for repeating the cycle.

Suitable insulation can be employed about the respective molds and the heated platens during the heating portions of the cycle in order to conserve heat, as well as make a more plesant and cooler place for employees to work.

The following example illustrates an embodiment of this invention.

EXAMPLE

A steel mold comprising the separable pieces described hereinbefore was assembled as described hereinbefore and heated to 325°F. Thereafter, a compression ring 47 was removed and a strip of rubber inserted into the top of the seal cavity intermediate the interior wall of the master ring 49 and about the stem 53. The hot compression ring 47 was pushed into the top of the cavity. The rubber ring 43 was softened by the heat, and was pushed downwardly by the compression ring 47. The rubber was extruded into and completely filled the seal cavity; even the small dimension openings, such as the slots 61 intermediate the teeth 59 and into the grooves 55 and 57 in, respectively, the stem 53 and the master ring 49. The mold was clamped into place with the desired pressure on the compression ring 47, effecting the compression and transfer molding. The mold and the seal material was heated to the vulcanizing temperature of 325°F and held in place for 10 minutes intermediate the heated platens 45 and inside an insulated cabinet. Thereafter, the mold and the seal were removed. The compression ring 47 was lifted out of the master ring, leaving the top of the seal cavity open. Thereafter, the remainder of the mold was inverted. The press ring 51 was thereafter lifted from the top of the inverted master ring 49. The same tongs 69 were employed. Next, the stem 53 was removed and the completed seal 11 ejected from the aperture 63 in the bottom of the inverted master ring 49. The aperture 63 has a larger diameter than the remainder of the aperture in the master ring 49. No damage was done to the seal.

From the foregoing, it can be seen that this invention accomplishes the objects delineated hereinbefore. Specifically, the invention provides a method of manufacturing a dynamic pressure seal with external lips and provides an acceptably low damage and rejection rate.

Having thus described the invention, it will be understood that such description has been given by way of illustration and example and not by way of limitation, reference for the latter purpose being had to the appended claims.

What is claimed is:

1. A method of manufacturing an annular seal having protruding sealing lips that must not be damaged; said method combining both compression and transfer molding techniques and comprising the steps of repeating cycles, including:
   a. assembling a mold by emplacing a stem within a press ring with said press ring being on the bottom, slipping a master ring over and conformingly engaging a portion of said press ring and concentrically about said stem so as to define a seal cavity, providing interior and exterior grooves in respective said stem and said master ring for forming said sealing lips, providing upwardly protruding teeth on said press ring such that a seal material forced into said seal cavity will have the desired shape of said seal, providing slots intermediate said teeth and disposed at an angle such that said seal is formed with no radial along which there is solid material in said seal between its interior wall and its exterior wall; and providing a compression ring for forcing seal material into said seal cavity;
   b. heating said mold to a first predetermined temperature;
   c. inserting into at least the top of said seal cavity a predetermined piece of seal material for forming said seal;
   d. pressing said compression ring into conforming fit in the top of said cavity, thereby forcing by compression and transfer said seal material into said seal cavity to completely fill same in order to form said seal with its said sealing lips and ribs at an angle such that no radial has solid material intermediate the interior and exterior wall of said seal;
   e. pressing, clamping and heating said mold and said seal at a vulcanizing temperature for a predetermined time interval sufficient to convert said seal material in the form of the raw said seal into a final vulcanized said seal;
   f. unloading said seal by a critical series of steps that alleviates problems with damaging said seal; said steps being:
      i. pulling out said compression ring from a first end of said master ring and the top of said seal cavity;
      ii. removing said press ring from the second and opposite end of said master ring, thereby withdrawing said teeth from within said seal to allow said seal to flex and accommodate otherwise damaging deformation;
      iii. removing said stem out of said second end of said master ring such that said groove on said stem slips out of engagement with said sealing lips of said seal by moving said sealing lips along an inclined surface instead of pulling against a surface inclined at 90° to the central longitudinal axis of said stem;
      iv. removing said seal out of said first end of said master ring such that said sealing lips slip out of engagement with said grooves in said master ring by moving along an inclined surface instead of pulling against a surface inclined at 90° to the central longitudinal axis of said master ring; and
   g. repeating said cycle.

2. The method of claim 1 wherein said inserting of said predetermined seal material comprising laying in an elongate cylinder of said seal material and curving it around the top of said cavity such that its ends are adjacent each other within said cavity.

3. The method of claim 2 wherein said material is rubber.

4. The method of claim 3 wherein said elongate cylinder of said rubber is extruded before being emplaced in said seal cavity.

5. The method of claim 1 wherein the remainder of said mold is inverted after said compression ring is pulled from said master ring in accordance with step f.i.; and thereafter said press ring and said stem are removed upwardly in their respective turns and said seal is ejected downwardly.

* * * * *